United States Patent [19]

Herb et al.

[11] 4,104,940
[45] Aug. 8, 1978

[54] NIBBLING MACHINE HAVING AUTOMATICALLY ADJUSTABLE FEED CONTROL

[75] Inventors: Eugen Herb, Ditzingen; Theodor Petera, Stuttgart; Hubert Bitzel, Ditzingen, all of Germany

[73] Assignee: Trumpf Maschinen AG, Zug, Switzerland

[21] Appl. No.: 713,495

[22] Filed: Aug. 11, 1976

[30] Foreign Application Priority Data

Aug. 16, 1975 [DE] Fed. Rep. of Germany ....... 2536524

[51] Int. Cl.² .............................................. B23D 27/00
[52] U.S. Cl. .......................................... 83/71; 83/219; 83/221; 83/403.1; 83/916
[58] Field of Search ...................... 83/916, 917, 403.1, 83/219, 221, 71, 209, 202, 237; 72/7; 234/59; 269/73, 71

[56] References Cited
U.S. PATENT DOCUMENTS

| | | | |
|---|---|---|---|
| 3,563,123 | 2/1971 | Leibinger | 83/916 X |
| 3,991,636 | 11/1976 | Devillers | 83/71 X |
| 4,023,788 | 5/1977 | Herb et al. | 83/916 X |

*Primary Examiner*—Frank T. Yost
*Attorney, Agent, or Firm*—McGlew and Tuttle

[57] ABSTRACT

A nibbling machine comprises a workpiece support which is driven by separate drive motors in longitudinal and transverse directions to shift the workpiece during the times at which it is not contacted by a punch which is arranged to reciprocate over the workpiece and to contact it and effect the nibbling thereof. A rotary control member is rotated in timed relationship to the means for driving the punch and it is connected to each of the motors for driving the workpiece support in a manner to start and stop these motors when the punch is raised off the workpiece for feeding the workpiece. The rotary member advantageously drives through an eccentric of adjustable magnitude to a fluid piston movable in a cylinder to displace a control fluid selectively to an oil volume dispenser which supplies oil to each of the fluid drive motors for operating the workpiece support in the transverse and longitudinal directions. Variations in the eccentric drive will cause variations in the timing of the drive of the fluid motors. The same control may be effected by an electrical drive system wherein the rotation of the control member causes actuation of an electric signal in proportion to the rotational position and the speed of rotation of the member. The adjustment may be effected by shifting pulse producing elements around on the surface of the control member so that a smaller or larger number of these elements pass a switch control dependent upon their distribution over the surface of the control member and the speed of rotation of the control member.

11 Claims, 4 Drawing Figures

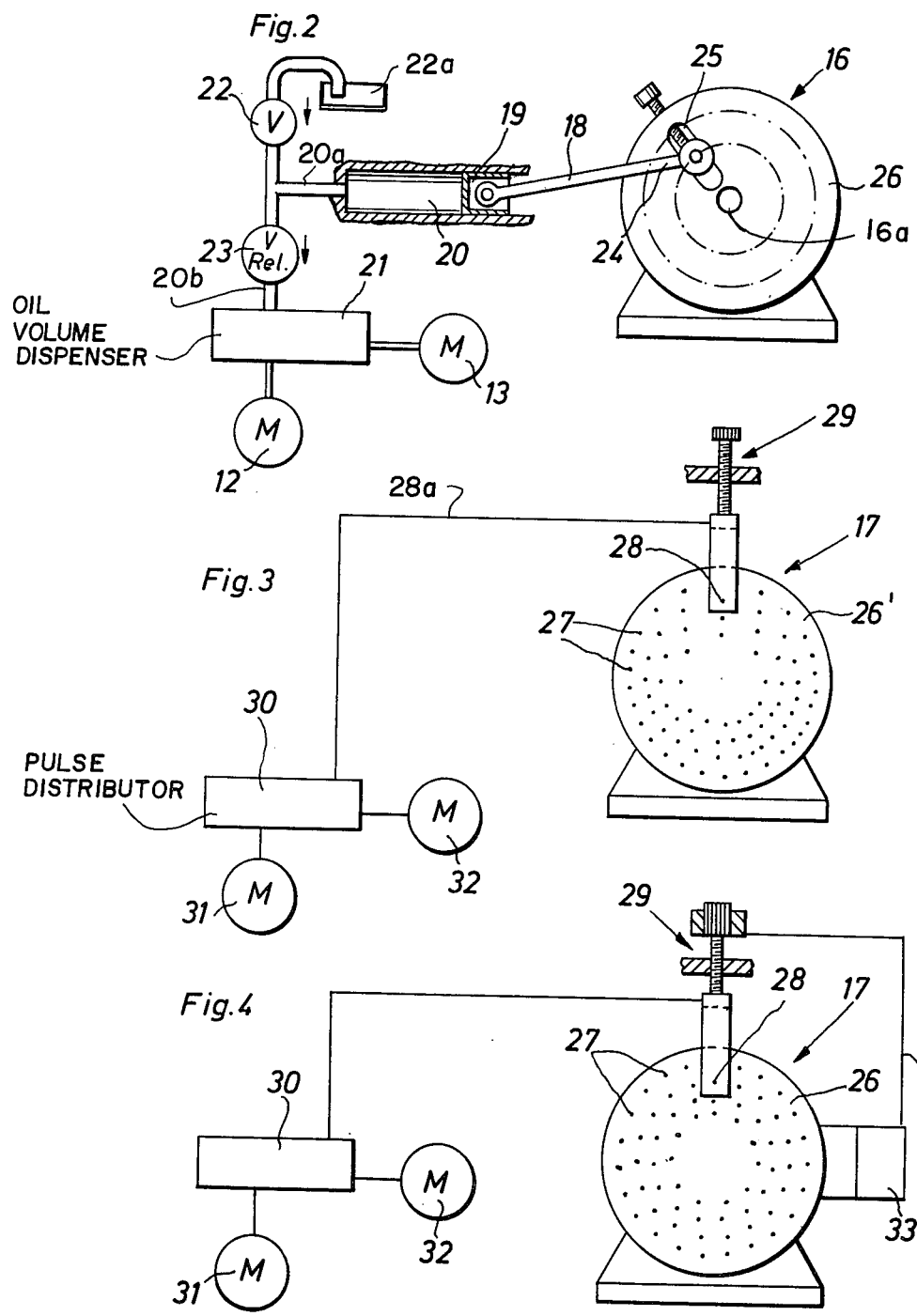

4,104,940

NIBBLING MACHINE HAVING AUTOMATICALLY ADJUSTABLE FEED CONTROL

BACKGROUND OF THE INVENTION

1. Field of the Invention

This invention relates in general to a nibbling machine construction and in particular to a new and useful device for controlling the feed of the workpiece in respect to a nibbling punch so that the most advantageous feed thereof may be effected during the lift off of the punch from the workpiece.

2. Description of the Prior Art

The present invention relates to a feed control for a nibbling machine including, in particular, longitudinal and cross feed mechanisms, in which the feed drive is released only during the time that the punch is disengaged from the workpiece. As is well known, the workpiece can be fed only within the period of time during which the punch is off the workpiece. A suitable arrangement ensures that the feed motors can be put in operation only within this time of feed release. Assuming a quite definite stroke of the punch, such an arrangement means that the time of feed release becomes the shorter the thicker the material to be nibbled is. On the other hand, the thickness of the material is also one of the determining criteria for the feed step. If now with nibbling machines of the prior art, the magnitude of the feed step and of the feed velocity is predetermined, as a rule, the following happens: with a feed velocity which is too small, the provided feed step is not accomplished, since upon expiration of the time of feed release, the feed motion is stopped. If, on the other hand, the adjusted feed velocity is too large, the feed stops prior to the expiration of the time of feed release, i.e., the velocity and acceleration of the feed motion of the workpiece are unnecessarily high and, consequently, the machine is loaded to an unnecessary degree.

SUMMARY OF THE INVENTION

The present invention is directed to a feed control for a nibbling machine which ensures that both the unnecessary loading of the machine is avoided and the entire feed step is accomplished.

In accordance with the invention a feed control is provided which is designed so that the sequence of operations of the control device covers a period of time corresponding to the time of feed release. In practice, for reasons of security, this period of time will be chosen slightly shorter than the time of feed release, however, for purposes of the following discussuion, this difference will be left out of consideration. The operation of the control device is governed by a sensing, pick-off, or transmission member which is displaceable in particular, transversely to the working movement of the control device, and transmitted, preferably, mechanically or electrically to the feed drive for the workpiece. This means that the feed drive or drives are set in motion during the time of transmission, i.e., also during the operation of the control device and, in consequence, for the period of time of the feed release. In this manner, an unnecessarily premature termination of the feed, i.e., a premature stopping of the feed motion as a result of the expiration of the time of feed release is prevented. From the point of view of the control technique, no difficulties arise in predetermining the time necessary for performing the sequence of operations of the control device in accordance with the feed release time resulting from a definite sheet thickness. The sensing, pick-off, or transmission member which is displaceable, in particular, transversely to the working movement of the control device, and transmitted, preferably, mechanically or electrically to the feed drive for the workpiece. This means that the feed drive or drives are set in motion during the time of transmission, i.e., also during the operation of the control device and, in consequence, for the period of time of the feed release. In this manner, an unnecessarily premature termination of the feed, i.e., a premature stopping of the feed motion as a result of the expiration of the time of feed release is prevented. From the point of view of the control technique, no difficulties arise in predetermining the time necessary for performing the sequence of operations of the control device in accordance with the feed release time resulting from a definite sheet thickness. The sensing, pick-off, or transmission member can be displaced transversely, in particular, perpendicualarly to the working motion, and this displacement makes it possible, with a corresponding design of the control device, to take into account another quantity, namely the magnitude of the feed step. Control means are known which permit a definite transverse displacement of the sensing, pick-off, or transmission member with a larger or smaller feed step. As soon as the feed step is determined in this manner and the time of feed release becomes a fixed value, the right feed velocity adjusts automatically due to the fact that, in practice, the feed of the workpiece starts with the beginning of the period of time of the feed release and stops with the expiration of this period of time. Thus, in accordance with the provided effect, an optimum in the protection and, at the same time, utilization of the nibbling machine equipped with the inventive feed contol is obtained.

According to a development of the invention, the control device comprises a control member which, in particular, has the shape of a disk and is mounted for rotation and associated with transmission means in the form of a sensing, pick-off or transmission member. In this case, preferably, the working motion may correspond to a complete revolution of the disk. Then, it is not necessary, after a working motion, to return the control device into its initial position, the control device returns rather automatically into this position upon termination of the working motion.

A further development of the invention provides that the transmission member comprises a connecting rod which is pivoted to a hydraulic piston which, in turn, is hydraulically connected to the hydraulic feed motor or motors, that one end of the connecting rod is displaceable transversely to the circumference of the disk-shaped control member and adapted to be fixed in any position of displacement, and that during the time of feed release, the hydraulic piston executes one working stroke. During the working stroke, the piston displaces a predetermined volume of the hydraulic fluid. This volume is supplied to the hydraulic feed motor or motors which, consequently, effect the feed step corresponding to the supplied volume of fluid. For the duration of the back stroke of the piston, the supply to the feed motors must be interrupted by a check valve, while a shut-off member, which is closed during the working stroke, is open to permit new fluid to be taken in. The magnitude of the feed step can easily be varied and adjusted by a radial displacement of the pivot point of the connecting rod. The back stroke of the working piston or further rotation of the control member up to the accomplishment of a full revolution takes place during the working stroke of the nibbling punch. The characteristic of such a piston drive can easily be charged, in a well known manner, for example, by extending or shortening the connecting rod.

Advantageously, a feed control system comprising a longitudinal feed and a transverse feed motor is provided with an oil volume dispenser which is connected between the feed motors and the hydraulic piston. The dispenser is controlled, for example, off a switching station in accordance with a predetermined program, and distributes the available oil volume or, in general, the amount of energy, to the two feed motors in a manner such as to cause a pure longitudinal, a pure transverse, or an oblique motion in a predetermined direction.

In another variant of the invention, the disk-shaped control member is designed as a pulse transmitter and includes pulse-producing elements arranged on concentric circles which can be sensed by means of a sensing member comprising a non-contacting switch. The number of the elements provided on the individual circles is unequal. During the period of time of feed release, the control member performs a complete revolution. In contradistinction to the mechanical variant, in this electrical or electronic variant, the control member does not perform any motion during the time the nibbling punch is engaged in the workpiece. On the other hand, in this variant, the magnitude of the feed step can be varied only gradually. In practice, however, this is not important because, in spite of that, a very fine variation of the feed step magnitude is possible and, besides, limits are set to the variation of the feed step magnitude by the thickness of the nibbling punch and by other factors, for example, the thickness of the workpiece. Thus, for changing the magnitude of the feed step, the sensing member which, particularly, is designed as a non-contacting switch, is associated with one of the provided circles of pulse-producing elements. Since the number of the elements varies from circle to circle, the association means that within one revolution of the control member or within the time of feed release, a quite definite number of pulses is collected and can be transmitted to the feed motor or motors. The number of pulses is proportional to the magnitude of the feed step.

It is imaginable, theoretically, that along a certain circular sector, no pulse producing elements are provided and, consequently, the working motion of the control member is restricted to an angle smaller than 360°. In such a case, the further rotation up to the complete revolution takes place during the working stroke of the nibbling punch.

Since the circumference of a circle becomes longer with the distance from the center, it is advantageous to provide a smaller number of pulse producing elements on the inner circle than on the respective adjacent outer circle. This makes it possible to provide an equal spacing of the elements on the individual circles.

It may be very advantageous to provide at least partly an unequal spacing of the pulse-producing elements on a circle and, particularly, a constant speed of rotation of the disk-shaped control member. This permits variation of the feed velocity time curve within large limits. Normally, the area limited by this curve is trapezoidal, i.e., the workpiece must, first, be accelerated to the provided maximum speed and, after keeping the maximum speed for a certain time, braked again to zero. With corresponding arrangements of the pulse-producing elements, a triangular shape of this curve, for example, may be obtained, so that up to a certain maximum speed, the workpiece is accelerated and then immediately braked to zero again. In this case, the curves of acceleration and braking are flatter than with a trapezoidal shape of the curve, which results in a further protection of the nibbling machine. Instead of a triangular shape, also a sinusoidal shape, for example, could easily be provided and would be advantageous for avoiding sudden speed changes, particularly, in the middle range of the feed.

Another embodiment of the invention provides that the speed of rotation of the disk-shaped control member varies in the course of one revolution while, in particular, the pulse-producing elements of a circle are equidistantly spaced from each other. Here, the effect, namely the influence on the feed-velocity/time curve, is the same. The technically simpler solution is certainly the unequal spacing of the pulse-producing elements on the circle, with a uniform rotation of the control member. Conceivable are, of course, also mixed forms and, in practice, such a mixed mechanism results already, in the first variant, merely from the fact that the control member must be initially accelerated, at the start of its revolution, and braked again, at the end of the rotary motion. But this can be obtained with relatively small angles of rotation so that for the greatest part of the rotary motion, a constant angular velocity is ensured.

According to a further development of the invention, the speed of rotation of the disk-shaped control member is variable by means of a speed governor which can be controlled by the sensing, pick-off, or transmission member.

Finally, in accordance with another feature of the invention, a pulse-quantity distributor is connected between the feed motors and the control device. The distributor acts in the same manner as the oil volume dispenser of the mechanical variant of the invention.

Accordingly it is an object of the invention to provide a nibbling machine which comprises a workpiece support means with first and second drives for shifting the support means in respective longitudinal and transverse directions in timed relationship to the reciprocation of a punch and which also includes a rotary control member which is rotatable in timed relationship to the drive of the punch and is connected through a transmission means to the respective longitudinal and transverse drives of the workpiece support and which also includes adjustment means associated with the transmission means for varying the direct mechanical transmission for the operation of the two motor drives of the workpiece support or an electrical pulse transmission for effecting such operation.

A further object of the invention is to provide a nibbling machine having a control for shifting the workpiece which is operative during the removal of the punch from the workpiece and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWINGS

In the Drawings:

FIG. 2 is a schematic side elevational view of a mechanically operated feed control for the workpiece support drive motors shown in FIG. 1; and FIGS. 3 and 4 are views similar to FIG. 2 of distinct embodiments of the invention.

GENERAL DESCRIPTION OF THE PREFERRED EMBODIMENTS

Figure 1:
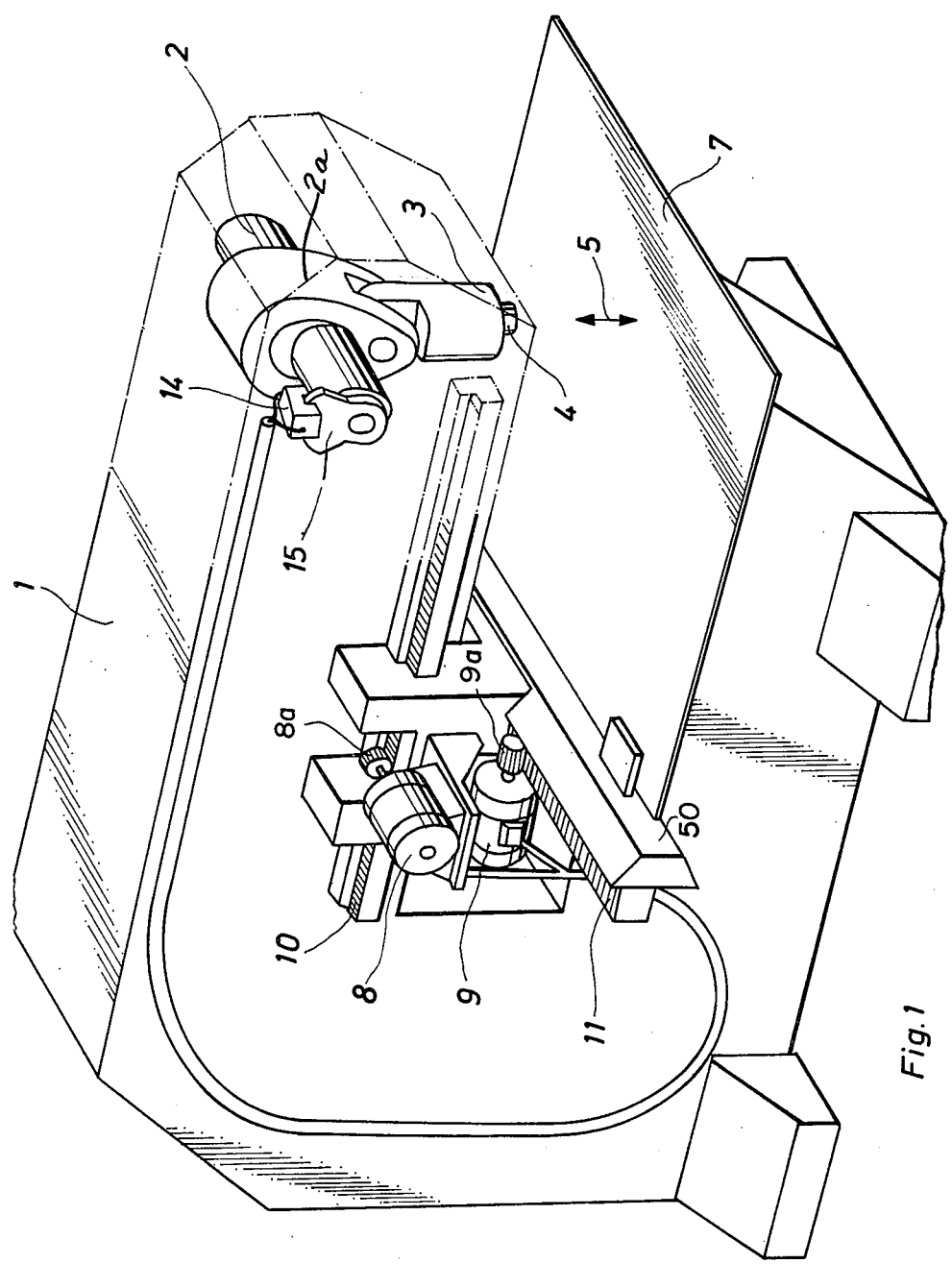
FIG. 1 is a front top perspective view of a nibbling machine constructed in accordance with the invention.

Referring to the drawings in particular, the invention embodied therein in FIGS. 1 and 2 comprises a nibbling machine which as shown in FIG. 1 includes a workpiece support 50 which is driven in a longitudinal direction by a first drive motor 8 having a pinion 8a engaged on a rack 10 which is shifted longitudinally with the workpiece support 50 and through a second drive motor 9 having a pinion 9a which drives a rack 11 to shift the workpiece support 50 transversely. This feed motion is carried out during the lift off of a punch 4 from the workpiece 7. The punch 4 is reciprocated by rotation of a shaft 2 which is connected through an eccentric connection 2a to the punch to effect the reciprocation thereof in the direction of the double arrows 5 to effect the nibbling of the workpiece 7. The punch is carried on a ram 3 which is connected to the eccentric connection 2a of the shaft 2. The punch cooperates with a die (not shown). The workpiece 7 which is to be nibbled is centrally positioned within a machine frame 1 on the support 50 and it is fed so as to be displaceable relative to the punch 4 in both longitudinal and transverse directions by the motors 8 and 9 respectively. The feed motors 8 and 9 may be switched on and off individually and simultaneously and the mechanism makes it possible to displace the workpiece in any direction. Instead of the rotary motors 8 and 9 any drive means for effecting the reciprocating working motion of the workpiece 7 may be employed. A displacement of the workpiece 7 is possible only with the punch 4 completely out of the workpiece. Assuming a punch stroke of a constant length, the distance which can be covered by the punch outside of the workpiece and therefor the feed release time becomes smaller with an increase of plate thickness. The thicker the plate the shorter the switch on period of time which is available for the two feed motors 8 and 9 to move the workpiece 7. To insure that the workpiece feed starts only after the punch is completely disengaged from the workpiece and stops prior to the reengagement thereof the machine includes a switching mechanism which in an embodiment covered by a previous copending patent application of the present inventor includes a fixed switch 14 which is arranged in the path of rotatable movement of a switching lug 15 which is connected to the shaft 2 for rotation therewith. The feed release time begins for example at the instant the switching lug 15 enters into a receiving slot of the switch 14 aand it expires when the lug 15 leaves the slot of the switch 14.

The magnitude of each feed step between two automatically effected punch strokes is, inter alia, a function of the thickness of the workpieces and it may be predetermined. The inventive control to be described hereinafter assures that the feed step starts at the moment the feed is released and is completed only at the expiration of the feed release time. It also insures that unnecessary negative accelerations of the workpiece are avoided and a 100% utilization of the feed release time.

In accordance with the invention, a rotary control member generally designed 16 is rotated in timed relationship to the feed of the punch 4 such as by a direct connection through a shaft 16a of the device to the shaft 2. In the embodiment shown in FIG. 2 transmission means are provided between the rotary control device in the form of a disk 26 and the respective start and stop control 12 and 13 for the transverse and longitudinal feed motors 9 and 8 respectively. In the embodiment of FIG. 2 the transmission comprises a mechanical connection including a connecting rod 18 having one end which may be adjustable positioned in respect to the center of rotation of the disk 26 by means of an adjustable screw 25 and an opposite end which is connected to a piston 19 which is slidable in a cylinder 20. The cylinder 20 advantageously comprises a hydraulic cylinder which displaces during its movement a fluid preferably oil which passes outwardly through a discharge line 20a and is eventually delivered to fluid controls 12 and 13 for drive motors 9 and 8 which are advantageously made hydraulically operated. An oil volume dispenser 21 located in a connecting line 20b which interconnects the line 20a through a check valve 23 which permits flow only in a direction toward the dispenser 21. Dispenser 21 may be controlled for example by a preset program of the nibbling machine and it determines the volume to be delivered to the hydraulic control 12 or 13 which are connected to hydraulic motors for effecting the longitudinal and transverse drives. When a pure transverse motion is to be effected the entire oil volume is directed to the control 12 and for a purely longitudinal displacement only hydraulic control 13 is supplied. For a motion in an oblique direction the controls 12 and 13 receive proportional volumes. An automatically operating valve 22 located in the branch of line 20a prevents a back flow of the oil from the line 20a into a reservoir 22a. Oil cannot flow from the motor side through the connection 20b back into the connection 20a because of the check valve 23.

The stroke of the piston 19 is varied by the adjustment screw 25 and with the displacement of the connection of the connecting rod 18 to the disk 26 radially outwardly a greater volume of oil is displaced to result in a longer feed step. Assuming a uniform speed of rotation of control member 26 for any eccentricity of the connection, a longer feed step of course means also an increased feed velocity. However, nothing is changed in the fact that the entire feed step takes place within the feed release time and this time is fully utilized. The back stroke of the piston 19 and the remaining rotary motion of control member 26 up to the completion of one revolution takes place during the period of time in which the nibbling punch is engaged in the workpiece and thus during a period which is not available for the feed.

In the embodiment shown in FIG. 3, the control member comprises a control device 17 which includes a rotary disk 26' having a plurality of pulse producing elements distributed over its surface at selected angular and circumferential locations which are sensed by a sensing member 28 which is electrically connected through a connecting cable 28a to a pulse quantity distributor 30 which operates similar to the oil volume distributor 21 of the embodiment of FIG. 2. In this embodiment, the number of pulse producing elements 27 provided in the individual circles increases from the center of the disk 26' outwardly toward its periphery. Switch sensor 28 is mounted so that it may be displaceably positioned by adjustment of a threaded screw 29 or other suitable adjustment means so that it may be moved inwardly or outwardly in respect to the control disk 26'. Since the number of pulse producing elements 27 is proportional to the magnitude of the feed step, the magnitude of the feed step can be varied in this manner. Distributor 30 distributes the operating pulses to the feed motors 31 and 32 in accordance with a preset program so as to effect the movement of the workpiece support 50 by these motors in a desired preset program.

In the embodiment shown in FIG. 4 the pulse producing elements 27 of each circular arrangement around the control disk 26' are spaced from each other equidistantly. Their spacing in individual circles progressing outwardly from the center of the disk 26' is varied or they are not necessarily identical. In the embodiment of FIG. 3 the pulse producing elements 27 of each circle are unequally spaced. With a constant angular velocity this results in a varying time rate of the pulses arriving to the feed motors 31 and 32. Consequently, the feed velocity, acceleration and deceleration of the workpiece can be varied within large limits by a definite arrangement of the pulse producing elements on the individual circles alone. In the embodiments of FIGS. 2 and 3 the angular speed of control member 26 and 26' is preferably constant. This may be provided also in the variant of FIG. 4. On the other hand, however, the affect obtainable by an unequal spacing of the pulse producing elements as shown in FIG. 3 can be obtained also with an equidistant spacing of the elements if the angular velocity of the control member is varied in the course of a revolution. Irrespective of the starting and braking period of the control member 26 this variation of the rotary motion of member 26 can be produced by means of a central control or by a special control mechanism of the control device 17. In the last case, a speed governor 33 is provided. This governor is connected in addition to the adjusting mechanism 29 by an electrical connection 34 which provides for an automatic adjustment of the mechanism. Also adjustment of the control 29 to shift the position of the sensor 28 will also effect the change of the governor.

While specific embodiments of the invention have been shown and described in detail to illustrate the application of the principles of the invention, it will be understood that the invention may be embodied otherwise without departing from such principles.

What is claimed is:

1. A nibbling machine comprising workpiece support means, first drive means connected to said support means to move said support means in a longitudinal direction, second drive means connected to said support means to move said support means in a transverse direction, a punch engageable with the workpiece on said workpiece support to effect the nibbling thereof, third drive means connected to said punch to move said punch into and out of engagement with the workpiece on said support means, a control member movable in timed relationship to said third drive means, transmission means connected to said control member and respectively connected to said first and second drive means, said first and second drive means each including a drive motor, said control member having a control range of at least a portion of its movement corresponding to the time in which the punch is disengaged from the workpiece, said transmission means acting on said first and second drive means to control the starting, stopping and speed thereof during the control range of said control member for varying the magnitude and direction and amount of feeding when the punch is not engaged with the workpiece, said control member and said transmission means together providing a full control of the operation of said first and second drive means in respect to starting and stopping and speed thereof during the time in which the punch is not in engagement with the workpiece.

2. A nibbling machine according to claim 1, wherein said control member comprises a rotary disk, said transmission means including a crank connected to said disk at a spaced location from the center thereof and having an opposite end, a fluid pressure cylinder, a volume distributor connected to said fluid pressure cylinder, said first and second drive means comprising fluid driven motors each connected to said volume distributor, said opposite end of said connecting rod connected to said piston for driving said piston to supply driving oil to said distributor for said fluid motors, said adjusting means comprising means for shifting said eccentric connection of said connecting rod to said disk.

3. A nibbling machine according to claim 1, wherein said control member comprises a rotatable disk, said transmission means comprising a sensor disposed adjacent said disk, said disk having pulse producing means thereon for actuating said sensor in accordance with the rotation of said disk, said sensor being connected to said first and second drive means for effecting the operation of said drive means in accordance with the pulses acting on said sensor.

4. A device according to claim 3, including a pulse distributor connected to said first and second drive means and to said sensor for distributing the pulses from said sensor respectively to said first and second drive means in accordance with a predetermined program.

5. A nibbling machine according to claim 1, including a governor for controlling the operation of said third drive means, said control member comprising a disk operated with said governor, a sensor arranged adjacent said disk, said disk having pulse transmitting means influencing said sensor in accordance with rotation thereof and means for adjusting the position of said sensor relative to said disk and for simultaneously adjusting said governor.

6. A nibbling machine according to claim 1, wherein said control member comprises a rotary disk, said disk having a plurality of pulse transmitting elements distributed over the surface thereof, a transmission means comprising a non-contacting switch arranged in association with said disk at a selected location, said pulse transmitting means on said disk being distributed around the surface of said disk at angularly spaced locations around a plurality of radially spaced circles, the number of said pulse producing elements on said circles being unequal, said disks being rotated at a speed so that the one complete revolution effects one complete control time of operation of said first and second drive means.

7. A nibbling machine according to claim 6, wherein the pulse producing elements arranged on an innermost circle are smaller than the number of pulse producing elements arranged on the progressively next outer circles.

8. A nibbling machine according to claim 6, wherein said pulse producing elements on each circle are at least partly unequally spaced from each other and the speed of rotation of said disk is constant.

9. A nibbling machine according to claim 6, wherein said control member is rotated at a varying speed of revolution and said pulse producing elements are equally spaced around each circle.

10. A nibbling machine according to claim 6, wherein said speed of rotation of said control member is varied, a governor connected to said disk to control the speed of rotation of said disk, said transmission means including a sensor associated with said disk and connected to said governor for varying the operating speed of said governor.

11. A nibbling machine according to claim 1, wherein said transmission means is an electrical sensor, said control member including a disk having pulse transmitting means thereon which move past said sensor and a pulse quantity distributor connected between said sensor and said first and second drive means for varying the operation of said drive means in accordance with the pulses which are sensed.

* * * * *